(12) United States Patent
Kimura et al.

(10) Patent No.: US 6,519,028 B2
(45) Date of Patent: Feb. 11, 2003

(54) OPTICAL CHARACTERISTIC MEASURING APPARATUS, THE METHOD THEREOF AND RECORDING MEDIUM

(75) Inventors: Eiji Kimura, Saitama (JP); Motoki Imamura, Saitama (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/900,968

(22) Filed: Jul. 10, 2001

(65) Prior Publication Data

US 2002/0024655 A1 Feb. 28, 2002

(30) Foreign Application Priority Data

Jul. 10, 2000 (JP) ......................... 2000-208845

(51) Int. Cl.[7] .............................................. G01N 21/00
(52) U.S. Cl. ...................................................... 356/73.1
(58) Field of Search ............................... 356/73.1, 429, 356/147; 250/227.26, 559.26; 359/341.44, 341.3, 138, 135, 173–177, 110, 247

(56) References Cited

U.S. PATENT DOCUMENTS

| 5,406,368 A | | 4/1995 | Horiuchi et al. | |
| 5,717,510 A | * | 2/1998 | Ishikawa et al. | 359/161 |
| 5,969,806 A | | 10/1999 | Bergano | |
| 6,088,088 A | | 7/2000 | Fortenberry | |
| 6,124,957 A | * | 9/2000 | Goel et al. | 359/110 |
| 6,324,375 B1 | * | 11/2001 | Hada et al. | 347/116 |

FOREIGN PATENT DOCUMENTS

| JP | 57-090132 | 6/1982 |
| JP | 61-105439 | 5/1986 |

* cited by examiner

Primary Examiner—Frank G. Font
Assistant Examiner—Tu T. Nguyen
(74) Attorney, Agent, or Firm—Lowe Hauptman Gilman & Berner, LLP

(57) ABSTRACT

An apparatus for measuring optical characteristics includes a variable-wavelength light source for generating a variable-wavelength light, having an identification waveform when the wavelength changes, the identification waveform being distinguishable from a normal waveform before and after the wavelength changes, an optical modulator for modulating the variable-wavelength light at a predetermined frequency and inputting it to an optical fiber; and an identification waveform detector for detecting the identification waveform of light transmitted through the optical fiber, wherein since the identification waveform detector detects when the waveform starts to change, it is possible to obtain synchronization between an incidence side and an exit side of the optical fiber. Accordingly, it is possible to obtain synchronization between an incidence side and an exit side of a device-under-test even if the wavelength of light source is continuously swept, whereby characteristics such as chromatic dispersion and the like can be measured.

21 Claims, 10 Drawing Sheets

FIG. 9(a) PRIOR ART
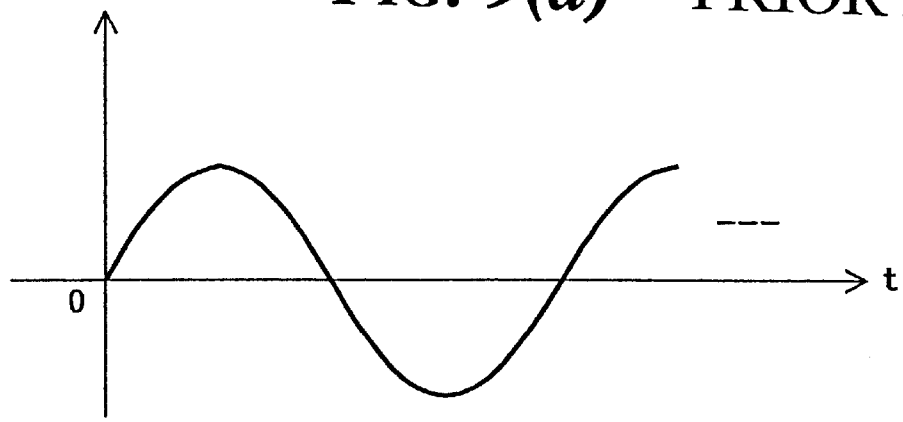
$t_0 = L/(C/n)$
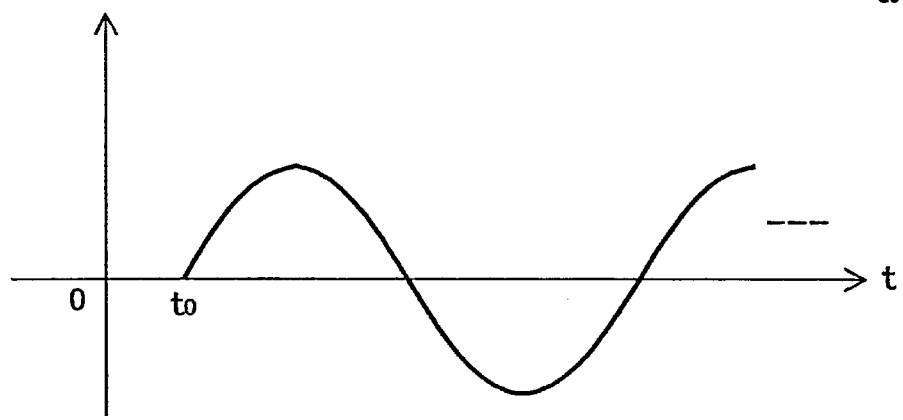
FIG. 9(b) PRIOR ART

OPTICAL CHARACTERISTIC MEASURING APPARATUS, THE METHOD THEREOF AND RECORDING MEDIUM

BACKGROUND OF INVENTION

1. Field of Invention

The present invention relates to the measurement of chromatic dispersion characteristics of a DUT (Device Under Test) such as an optical fiber, and in particular to the measurement which can obtain synchronization of a variable-wavelength light source and a phase comparator with a high precision, by providing the variable-wavelength light source at one end of the DUT and the phase comparator at the other end of the DUT.

2. Description of the Related Art

The construction of a measuring system which measures chromatic dispersion characteristics of the DUT such as an optical fiber is shown in FIG. 8. A light source system 100 is connected to one end of an optical fiber 300 and a measuring system 200 is connected to the other end of the optical fiber 300. The light source system 100 has a variable-wavelength light source 102 and an optical modulator 104. The measuring system 200 includes a photoelectric (OLE) converter 202 and a phase comparator 204.

In measuring chromatic dispersion characteristics, the variable-wavelength light source 102 changes the wavelength $\ddot{e}x$ of generated light. The light generated by the variable-wavelength light source 102 is modulated by a modulation frequency Fm in the optical modulator 104 and inputted to the optical fiber 300. The light transmitted through the optical fiber 300 is converted into an electric signal in the photoelectric (OLE) converter 202. The phase comparator 204 measures a phase difference between a phase of an electric signal and a phase which is to be a reference with respect to the electric signal. Group delay (GD) can be calculated from the phase difference and modulation frequency Fm. Chromatic dispersion (CD) can be calculated by differentiating group delay by the wavelength of the group delay. In addition, the frequencies of $\ddot{e}x$ and Fm are communicated to the measuring system 200.

Waveforms of light generated by the light source system 100 and light received by the measuring system 200 are schematically shown in FIGS. 9(a)–9(b). FIG. 9(a) shows the waveform of light generated by the light source system 100. FIG. 9(b) shows the waveform of light received by the measuring system 200. Time delay t0 added to the light generated by the light source system 100 makes a light to be received by the measuring system 200. However, for simplicity, the drawing shows as if there is no discrepancy of phases between the light generated by the light source system 100 and the light received by the measuring system 200. The time delay t0 is L/(c/n) {t0=L/(c/n)}, where L is length of optical fiber 300, c is velocity of light, and n is refraction index of optical fiber 300. In addition, t0 is increased as the length of optical fiber increases. For example, the length of optical fiber in a submarine cable and the like is about 10000 km, and to is up to 50 ms.

As shown in FIGS. 9(a)–9(b), in the light received by the measuring system 200, the time delay t0 is generated. Therefore, if the light source system 100 changes a wavelength directly after a light of a certain wavelength is generated, it becomes impossible to know $\ddot{e}x$ (wavelength of light generated by the variable wavelength light source 102) corresponding to the light received by the measuring system 200.

Therefore, the wavelength $\ddot{e}x$ of light generated by the light source system 100 is fixed from t0 to t1. FIG. 10 shows a method for changing the wavelength of light generated by the light source system 100. Firstly, a light, the wavelength of which is $\ddot{e}0$ from time 0 to t1, $\ddot{e}1$ from time t1 to 2t1, and so on, is generated. That is, the wavelength of light is changed in a step form.

Here, the variable-wavelength light source 102 cannot perform measurement of wavelength while continuously changing the waveform, even if it had a function which renders it possible to continuously sweep the wavelength. This is because it is impossible to exactly known $\ddot{e}x$ (wavelength of light generated by the variable-wavelength light source 102) corresponding to the light received by the measuring system 200. That is, it is impossible to obtain a synchronization of light source system 100 and measuring system 200. Therefore, the wavelength of light is changed in the step form and measured.

SUMMARY OF INVENTION

However, if the wavelength of light is changed in the step form and measured, the time required for measuring is longer than that required in the case of continuously sweeping the wavelength. Moreover, if wavelength changing values ($\lambda 2-\lambda 1$, $\lambda 1-\lambda 0$, ...) are not taken so high to a certain extent, the measuring time takes too long. Therefore, it is impossible to improve the resolution of wavelength.

Therefore, the object of the present invention is to provide a technique for measuring characteristics, such as chromatic dispersion and the like, by making it possible to continuously sweep the wavelength of light source.

According to the present invention, an apparatus for measuring optical characteristics of a device-under-test which transmits light, includes: a variable-wavelength light source for generating a variable-wavelength light, the wavelength of which is variable, having an identification waveform at the time when the wavelength is changing, wherein the identification waveform is distinguishable from a normal waveform before and after the time when the wavelength is changing; an optical modulation unit for modulating the variable-wavelength light at a predetermined frequency and then inputting it to the device-under-test; and an identification waveform detection unit for detecting the identification waveform in the transmitted light transmitted through the device-under-test.

According to the apparatus for measuring optical characteristics constructed as explained above, since the time when the identification waveform detection unit detects the identification waveform is the time when the waveform starts to change, it is possible to obtain a synchronization between an incidence side and an exit side of a device-under-test using the time when the identification waveform is detected. Accordingly, it is possible to obtain the synchronization between an incidence side and an exit side of a device-under-test, even if the wavelength of light source is continuously swept.

According to the present invention, an apparatus for measuring optical characteristics of a device-under-test which transmits light, includes: a variable-wavelength light source for generating a variable-wavelength light, the wavelength of which is variable, having an identification waveform at the time when the wavelength is changing, wherein the identification waveform is distinguishable from a normal waveform before and after the time when the wavelength is changing; and an optical modulation unit for modulating the variable-wavelength light at a predetermined frequency and then inputting it to the device-under-test.

According to the present invention, an apparatus for measuring optical characteristics of a device-under-test which transmits light, includes: an identification waveform detection unit for detecting identification waveform in a transmitted light which is an incident light transmitted through the device-under-test, wherein the incident light is a variable-wavelength light, the wavelength of which is variable, having in the form of the identification waveform at the time when the wavelength is changing, and wherein the identification waveform is distinguishable from a normal waveform before and after the time when the wavelength is changing.

The present invention described above, is an apparatus for measuring optical characteristics, wherein the identification waveform is a waveform different from the normal waveform in wavelength.

The present invention described above, is an apparatus for measuring optical characteristics, wherein the identification waveform is a waveform different from the normal waveform in output condition.

Here, the output condition corresponds to ON or OFF of the light source.

The present invention described above, is an apparatus for measuring optical characteristics, wherein the device-under-test includes a first optical line that transmits light only in one direction, and a second optical line that transmits light only in a direction opposite to the one direction, and wherein the variable-wavelength light source and optical modulation unit are connected to the incidence side of the first optical line and the identification waveform detection unit is connected to the exit side of the second optical line.

According to the present invention, an apparatus for measuring optical characteristics, further includes: a phase measuring unit for measuring the phase of the transmitted light by correlating it with the wavelength of the variable-wavelength using the time at which the identification waveform detection unit detects the identification waveform; and a characteristic calculation unit for calculating group delay characteristics or dispersion characteristics of device-under-test using the phase of the transmitted light.

According to the present invention, a method for measuring optical characteristics of a device-under-test which transmits light, includes: a variable-wavelength light generating step for generating a variable wavelength light, the wavelength of which is variable, having an identification waveform at the time when the wavelength is changing, wherein the identification waveform is distinguishable from a normal waveform before and after the time when the wavelength is changing; an optical modulation step for modulating the variable-wavelength light at a predetermined frequency and then inputting it to the device-under-test; and an identification waveform detection step for detecting the identification waveform in the transmitted light transmitted through the device-under-test.

According to the present invention, a method for measuring optical characteristics of a device-under-test which transmits light, includes: a variable-wavelength light generating step for generating a variable- wavelength light, the wavelength of which is variable, having an identification waveform at the time when the wavelength is changing, wherein the identification waveform is distinguishable from a normal waveform before and after the time when the wavelength is changing; and an optical modulation step for modulating the variable-wavelength light to a predetermined frequency and then inputting it to the device-under-test.

According to the present invention, a method for measuring optical characteristics of a device-under-test which transmits light, includes: an identification waveform detection step for detecting an identification waveform in a transmitted light which is an incident light transmitted through the device-under-test, wherein the incident light is a variable-wavelength light, the wavelength of which is variable, having in the form of the identification waveform at the time when the wavelength is changing, and wherein the identification waveform is distinguishable from a norinall waveform before and after the time when the wavelength is changing.

The present invention, is a computer-readable medium having a program of instructions for execution by the computer to perform an optical characteristic measuring process for measuring a characteristic of a device-under-test which transmits light, the optical characteristic measuring process including: a variable-wavelength light generating processing for generating a variable-wavelength light, the wavelength of which is variable, having an identification waveform at the time when the wavelength is changing, wherein the identification waveform is distinguishable from a normal waveform before and, after the time when the wavelength is changing; an optical modulation processing for modulating the variable-wavelength light at a predetermined frequency and then inputting it to the device-under-test; and an identification waveform detection processing for detecting the identification waveform in the transmitted light transmitted through the device-under-test.

The present invention, is a computer-readable medium having a program of instructions for execution by the computer to perform an optical characteristic measuring process for measuring a characteristic of a device-under-test which transmits light, the optical characteristic measuring process including: a variable-wavelength light generating processing for generating a variable-wavelength light, the wavelength of which is variable, having an identification waveform at the time when the wavelength is changing, wherein the identification waveform is distinguishable from a normal waveform before and after the time when the wavelength is changing; and an optical modulation processing for modulating the variable wavelength light at a predetermined frequency and then inputting it to the device under-test.

The present invention, is a computer-readable medium having a program of instructions for execution by the computer to perform an optical characteristic measuring process for measuring a characteristic of a device-under-test which transmits light, the optical characteristic measuring process including: an identification waveform detection processing for detecting identification waveform in a transmitted light which is an incident light transmitted through the device-under-test, wherein the incident light is a variable-wavelength light, the wavelength of which is variable, having in the form of the identification waveform at the time when the wavelength is changing, and wherein the identification waveform is distinguishable from a normal waveform before and after the time when the wavelength is changing.

The present invention is an apparatus for measuring optical characteristics, wherein the identification waveform is a waveform different from the normal waveform in wavelength.

The present invention, is an apparatus for measuring optical characteristics, wherein the identification waveform is a waveform different from the normal waveform in output condition.

The present invention, is an apparatus for measuring optical characteristics, further including: a phase measuring unit for measuring the phase of the transmitted light by correlating it with the wavelength of the variable-wavelength using the time at which the identification waveform detection unit detects the identification waveform; and a characteristic calculation unit for calculating group delay characteristics or dispersion characteristics of device-under-test using the phase of the transmitted light.

BRIEF DESCRIPTION OF THE DRAWINGS

FIGS. 3(a)–3(c) are flowcharts showing the operation of the first embodiment of the present invention, in which FIG. 3(a) shows the operation of light source system (10), FIG. 3(b) shows the operation of characteristic measuring system 20, and FIG. 3(c) shows the operation of identification waveform detection section 24;

FIGS. 9(a)–9(b) show waveforms of light produced by the optical light source system 100 (FIG. 9(a)) and of light received by the measuring system 200 (FIG. 9(b)) in the prior art.

DESCRIPTION OF THE PREFERRED EMBODIMENTS

Herein below, first embodiment of the present invention will be explained with reference to the drawings.

First Embodiment

Figure 1:
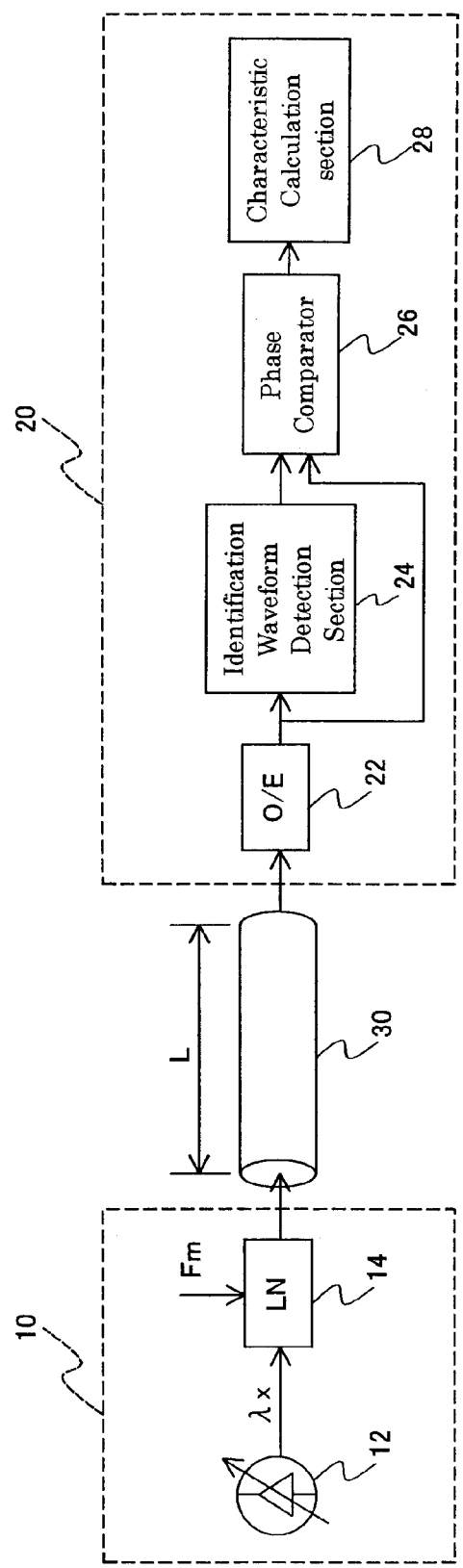
FIG. 1 is a block diagram showing the construction of an optical characteristic measuring apparatus according to the first embodiment of the present invention.

FIG. 1 is a block diagram showing the construction of an optical characteristic measuring apparatus according to the first embodiment of the present invention. The optical characteristic measuring apparatus includes a light source system 10 connected to one end of an optical fiber 30 and a characteristic measuring system 20 connected the other end of the optical fiber 30.

Figure 2A:
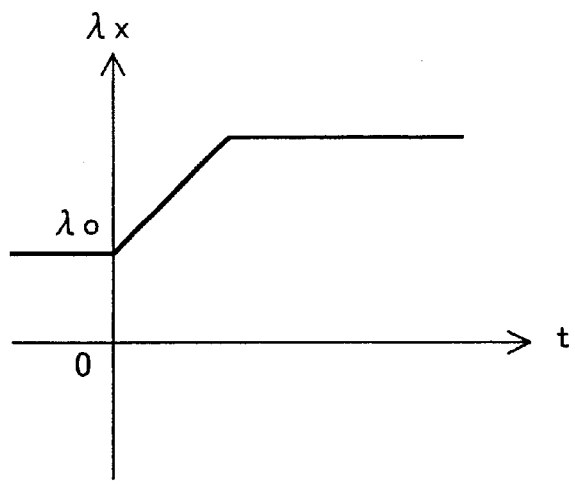
FIGS. 2(a)–2(d) show the waveforms and wavelengths of variable-wavelength light source 12.
Figure 2B:
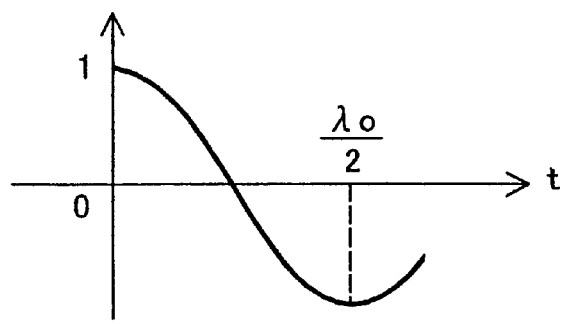
Figure 2C:
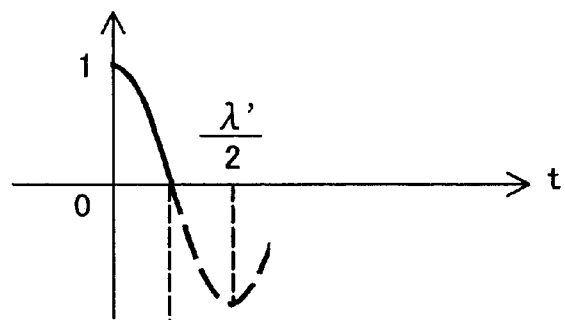
Figure 2D:
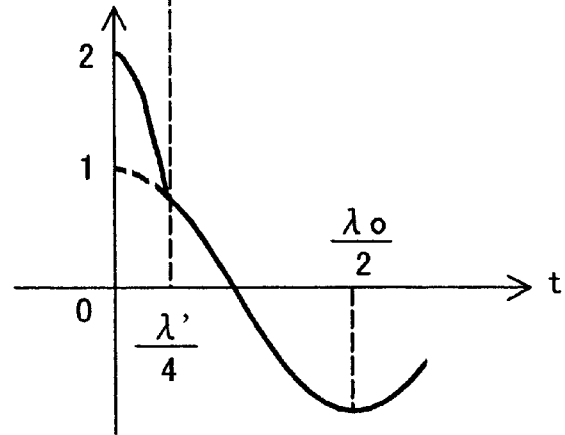

The light source system 10 comprises a variable-wavelength light source 12 and an optical modulator 14. The variable-wavelength light source 12 generates a variable-wavelength light, the wavelength of which is variable. It is possible to sweep the wavelength $\lambda$ x of variable-wavelength light by means of the variable-wavelength light source 12. For example, it is possible to sweep wavelength $\lambda$ x from t=0, as shown in FIG. 2(a). The variable-wavelength light source 12 has an identification waveform at the time when the wavelength starts to change (t 0), wherein the identification waveform is distinguishable from a normal waveform before and after that time. The normal waveform and the identification waveform will be explained with reference to FIGS. 2(b) to 2(d). FIG. 2(b) shows a normal waveform in the vicinity of t=0. The normal waveform is, for example, a sine wave of a wavelength $\lambda$ 0. FIG. 2(c) shows a waveform that serves as a basis for generating an identification waveform. For example, it is a sine wave of wavelength $\lambda'$, in which only quarter-wavelength portion is present. In addition, it is desired that $\lambda'$ is much smaller than $\lambda$0. FIG. 2(d) is a waveform of the variable-wavelength light source 12 in the time at which the wavelengths starts to change (t≈0). It is a waveform of multi-wavelength which is the sum of waveforms of FIGS. 2(b) and (c). The waveform of portion from t=0 to $\lambda'/4$ is an identification waveform. The waveform after t=$\lambda'/4$ is a normal waveform. The optical modulator 14 modulates the variable wavelength light to a frequency Fm. The optical modulator 14 may include lithium/niobate (LN). Also, it may not include LN if it can modulate a light. The light exited from the optical modulator 14 is inputted to an optical fiber line 30.

The light inputted to the optical fiber 30 transmits through the optical fiber 30. The light transmitted through the optical fiber 30 is referred to as transmitted light.

The characteristic measuring system 20 comprises a photoelectric converter 22, an identification waveform detection section 24, a phase comparator 26, and a characteristic calculation section 28.

The photoelectric converter 22 converts the transmitted light into an electrical signal. The identification wave detection section 24 detects an identification waveform from the electrical signal. The identification waveform detection section 24 also measures the time t0 at which the identification waveform appears in the transmitted light.

The phase comparator 26 measures the phase of the transmitted light by correlating it with the wavelength of the variable-wavelength light using the time t0 at which the identification waveform appears in the transmitted light. The phase difference is calculated by comparing the phase of the transmitted light with a phase at the time when the incident light having a reference wavelength is inputted.

That is, because the transmitted light has a time delay equal to the time t0 as compared to the incident light, the transmitted light corresponding to the incident light at an optical time t (wavelength, $\lambda$ x (I)) will be the transmitted light at the time t+t0. The phase of transmitted light at the time t+t0 will be corresponding to the wavelength $\lambda$ x (t) of incident light. The phase difference is calculated by comparing the phase of transmitted light with a phase at the time when the incident light having a reference wavelength is inputted.

The characteristic calculation section 28 records the phase difference measured by the phase comparator 26 and calculates either group delay characteristics or chromatic dispersion characteristics of the optical fiber 30 based on the phase. The group delay characteristics can be calculated from the relationship between the phase difference measured by the phase comparator 26 and the modulated frequency Fm. The chromatic dispersion characteristics can be calculated by differentiating the group delay characteristics by the wavelength of the group delay.

Figure 3C:
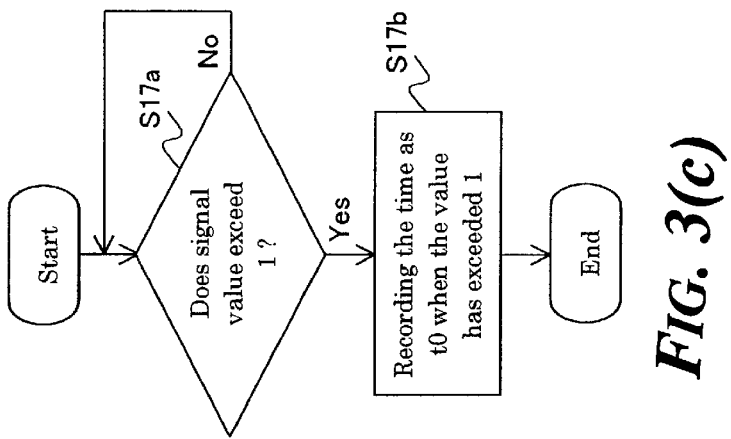
Figure 3B:
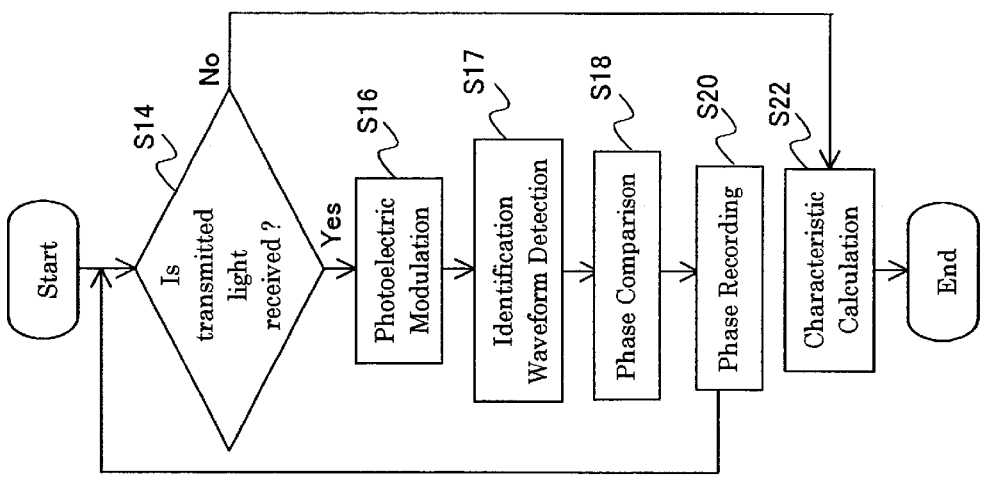
Figure 3A:
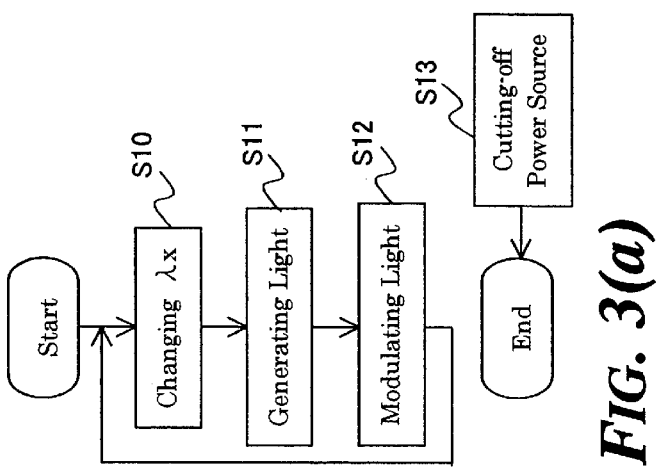

Next, the operation of the first embodiment of the present invention will be explained with reference to the flowcharts of FIGS. 3(a)–3(c). FIG. 3(a) and FIG. 3(b) respectively show operations of the light source system 10 and the characteristic measuring system 20. Firstly, the wavelength λx of variable-wavelength light is changed with reference to FIG. 3(a) (S10). Next, the variable-wavelength light source 12 generates a variable-wavelength light (λ=λ x) (S11). Next, the optical modulator 14 modulates the variable-wavelength light (S12). The modulated light is inputted to the optical fiber 30. And, it returns to the changing (sweeping) of the wavelength λ x of the variable-wavelength light (S10). In addition, at an optional point of time, the process is terminated by cutting-off a power source (S13).

The incident light is transmitted through the optical fiber 30. The light transmitted through the optical fiber 30 is referred to as the transmitted light.

Here, reference is made to FIG. 3(b). Firstly, it is determined whether the characteristic measuring system 20 has received the transmitted light (S14). If received (S14, Yes), the transmitted light is subjected to photoelectric conversion to an electrical signal by the photoelectric converter 22 (S16). The electrical signal is sent to the identification waveform detection section 24 and the identification waveform is detected from the electrical signal (S17). The identification waveform detection section 24 also measures time t0 at which the identification waveform appears in the transmitted light.

Figure 4A:
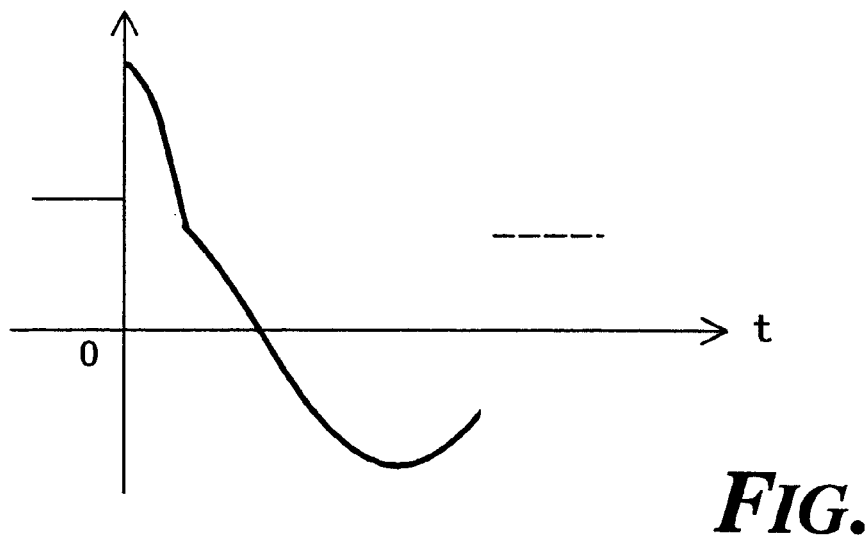
FIGS. 4(a)–4(b) show waveforms of incident light (FIG. 4(a)) and transmitted light (FIG. 4(b))
Figure 4B:
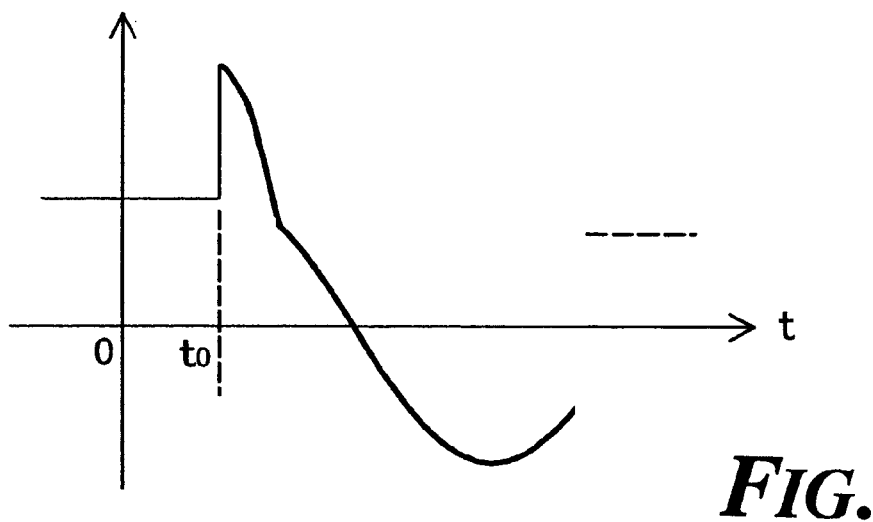

The detecting operation of identification waveform detection section 24 will be explained with reference to the flowchart of FIG. 3(c) and FIGS. 4(a)–4(b). FIG. 4(a) is a waveform of the incident light. FIG. 4(b) is a waveform of the exited light. The identification waveform appearing in the vicinity of t0 in FIG. 4(a) appears in the vicinity of t=to in FIG. 4(b). The t0 is a time delay of transmitted light in relation to the incident light. Assuming that the amplitude of normal waveform in the vicinity of t 0 is 1, the maximum amplitude value of identification waveform is two (2). Here, reference is made to FIG. 3(c). Firstly, the identification waveform detection section 24 determines whether or not the value of the electrical signal exceeds 1 (S17a). Here, if the value has not exceeded 1 (S17a, No), the process continuously returns to the monitoring of the electrical signal value (S17a), because the incident light, in which wavelength was swept, has not yet been received. If the value has exceeded 1 (S17a, Yes), the time at which the value has exceeded 1 is recorded as the time delay t0 (S17b), because the time at which the value has exceeded 1 is t0.

Returning to FIG. 3(b), the phase comparator 26 measures the phase of transmitted light by correlating it with the wavelength of the variable-wavelength light using the time to, at which the identification waveform appears in the transmitted light (S18). And, the phase difference is calculated by comparing the phase of the transmitted light with a phase at the time when the incident light having a reference wavelength is inputted.

Because the transmitted light has a time delay equal to the time t0 as compared to the incident light, the transmitted light corresponding to the incident light at an optional time t (wavelength λ x (t)) will be the transmitted light at the time t+t0. The phase of transmitted light at the time t+t0 will be corresponding to the wavelength λ x (t) of incident light. The phase difference is calculated by comparing the phase of transmitted light with a phase at the time when the incident light having a reference wavelength is inputted.

Next, the phase difference measured by being correlated with the wavelength λ x (t) of incident light is sent to the characteristic calculation section 28 and recorded therein (S20).

Here, if the characteristic measuring system 20 does not receive the transmitted light (S14, No), the characteristic calculation section 28 calculates either group delay characteristics or chromatic dispersion characteristics of the optical fiber 30 based on the recorded phase difference (S22). The group delay characteristics can be calculated from the relationship between the phase difference measured by the phase comparator 26 and the modulated frequency Fm. The chromatic dispersion characteristics can be calculated by differentiating the group delay characteristics by the wavelength of the group delay.

According to the first embodiment, it is possible to measure the phase difference by correlating it with the wavelength λ x (t) of incident light and the group delay characteristics can be calculated based on the phase difference. Therefore, it is possible to continuously change the wavelength, and measuring time is rapidly reduced rather than changing the wavelength in the step form. Furthermore, the precision in wavelength axis of measurement result is improved because the time of variable-wavelength can be exactly specified. Also, the resolution of wavelength is improved, because the wavelength is continuously swept.

In addition, although the first embodiment uses the optical fiber 30 as the device-under-test, it is also especially effective in measuring a line that has complicated characteristics using an optical filter and the like.

Second Embodiment

An optical characteristic measuring apparatus according to the second embodiment is different from the first embodiment in that it produces the identification waveform by switching output conditions, so to speak, by switching a variable wavelength light source 12 ON and OFF.

With reference to FIGS. 5(a)–5(b) and 6(a)–6(b), the identification waveforms of incident light will be explained. In the second embodiment, the output condition at t=0 is made to be different in the vicinity of t=0.

Figure 5A:
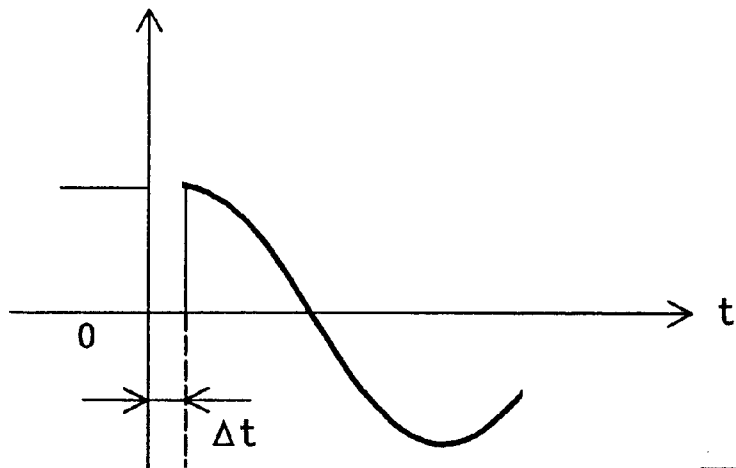
FIGS. 5(a)–5(b) show waveforms of incident light (FIG. 5(a)) and transmitted light (FIG. 5(b)) in the second embodiment.
Figure 5B:
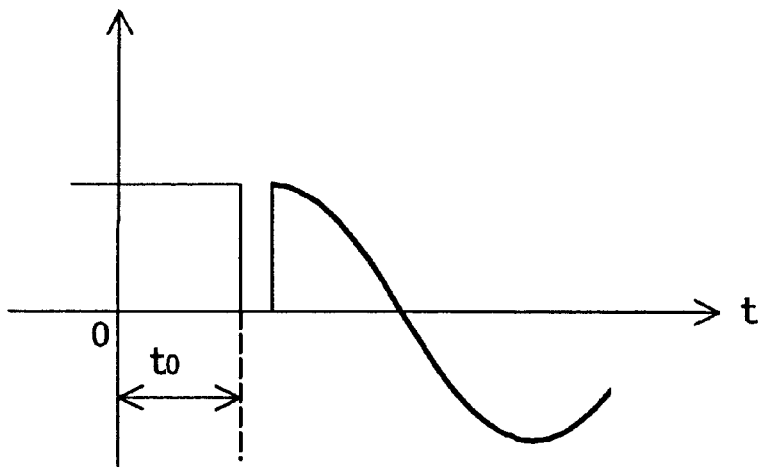

FIG. 5(a) is a waveform of the incident light. The output condition in the vicinity of t=0 is ON at any side. Therefore, the output condition at t=0 is set to OFF, that is, the variable-wavelength light source 12 is set to OFF. And, FIG. 5(b) is a waveform of the transmitted light. Because the value of the electrical signal is set to zero (0) with respect to the time delay to, the time when the value of the electrical signal is zero may be recorded as t0.

Figure 6A:
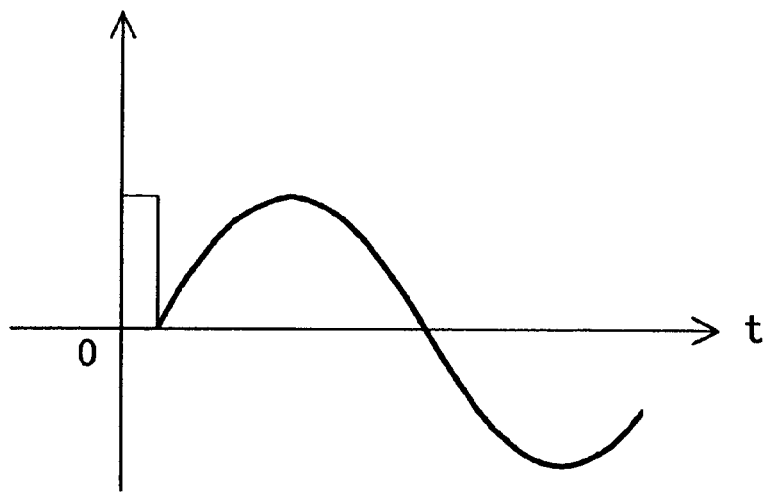
FIGS. 6(a)–6(b) show waveforms of incident light (FIG. 6(a)) and transmitted light (FIG. 6(b)) in the second embodiment.
Figure 6B:
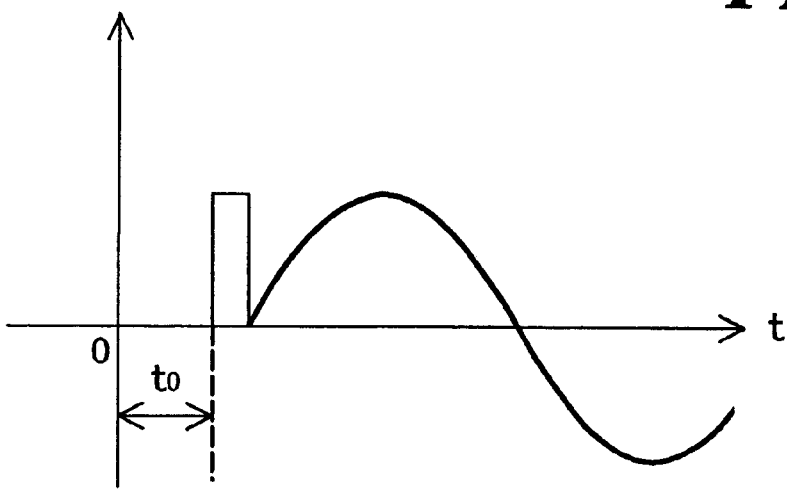

FIG. 6(a) is a waveform of the incident light. The output condition in the vicinity of t=0 is OFF at any side. Therefore, the output condition at t=0 is set to ON, that is, the variable-wavelength light source 12 is set to ON. And, FIG. 6(b) is a waveform of the transmitted light. Because the value of the electrical signal is set to 1 with respect to the time delay t0, the time when the value of the electrical signal is one may be recorded as t0.

In addition, the construction and operation of second embodiment are the same as those of first embodiment.

Third Embodiment

Figure 7:
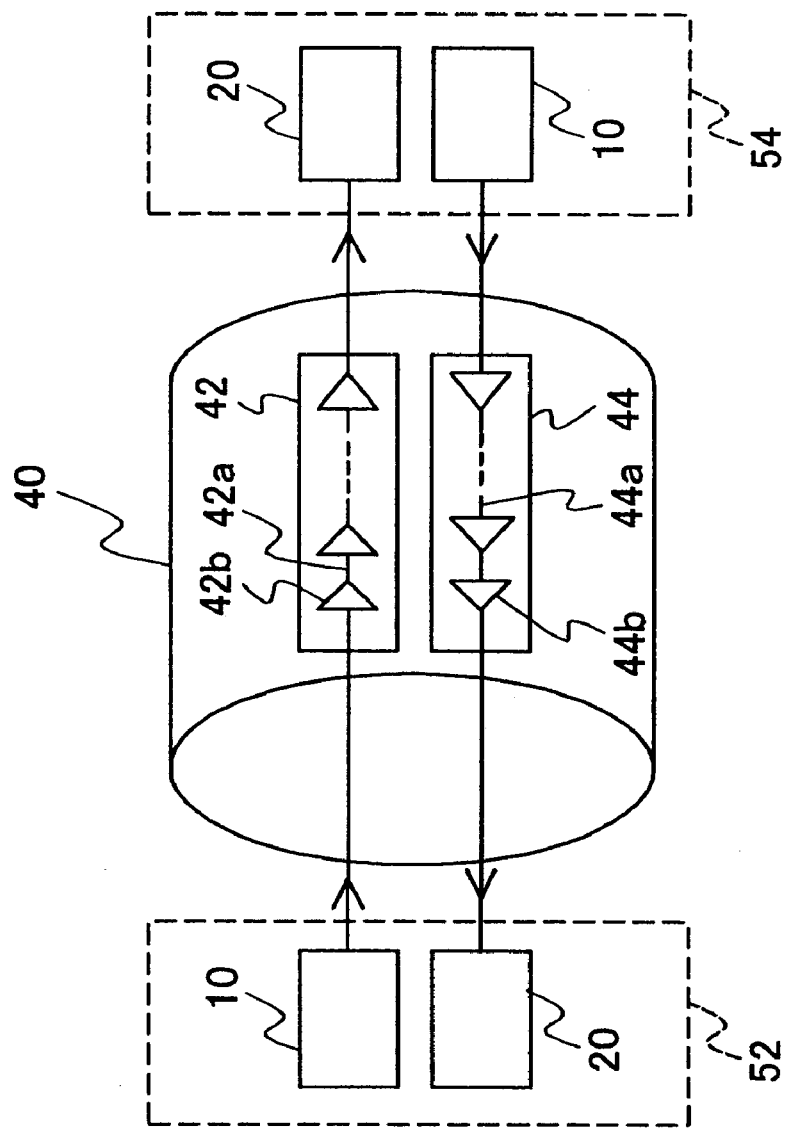
FIG. 7 is a block diagram showing the optical characteristic measuring apparatus according to the third embodiment of the present invention.
Figure 8:
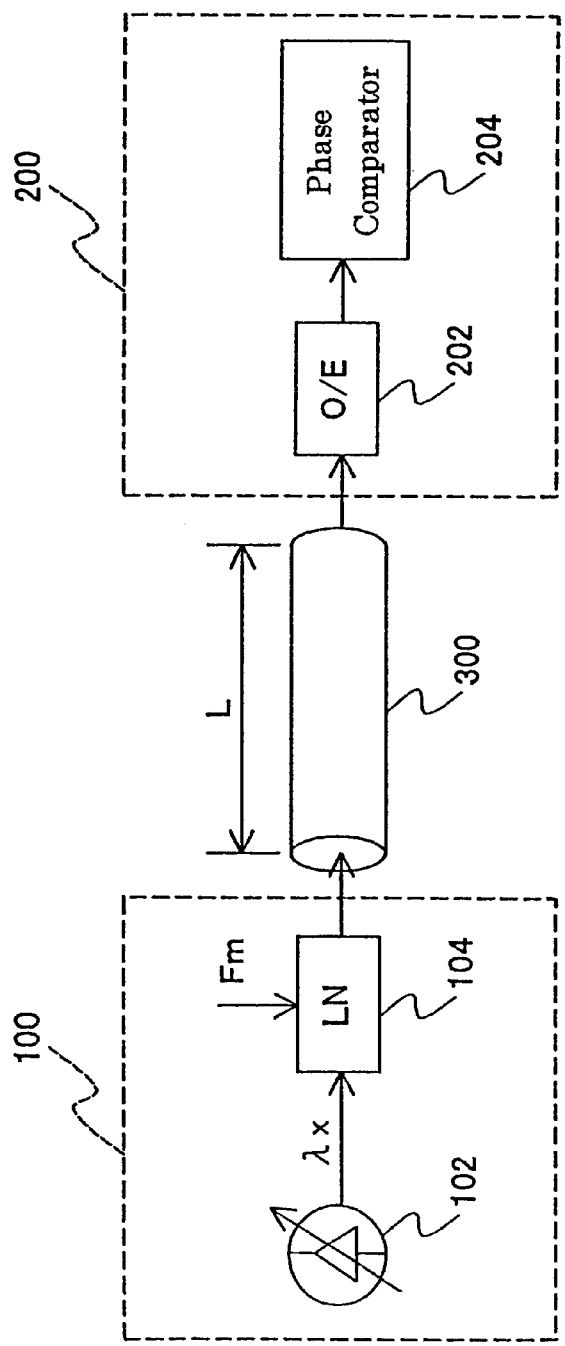
FIG. 8 is a block diagram showing a construction of measuring system for measuring chromatic dispersion characteristics of the DUT such as an optical fiber in the prior art.
Figure 10:
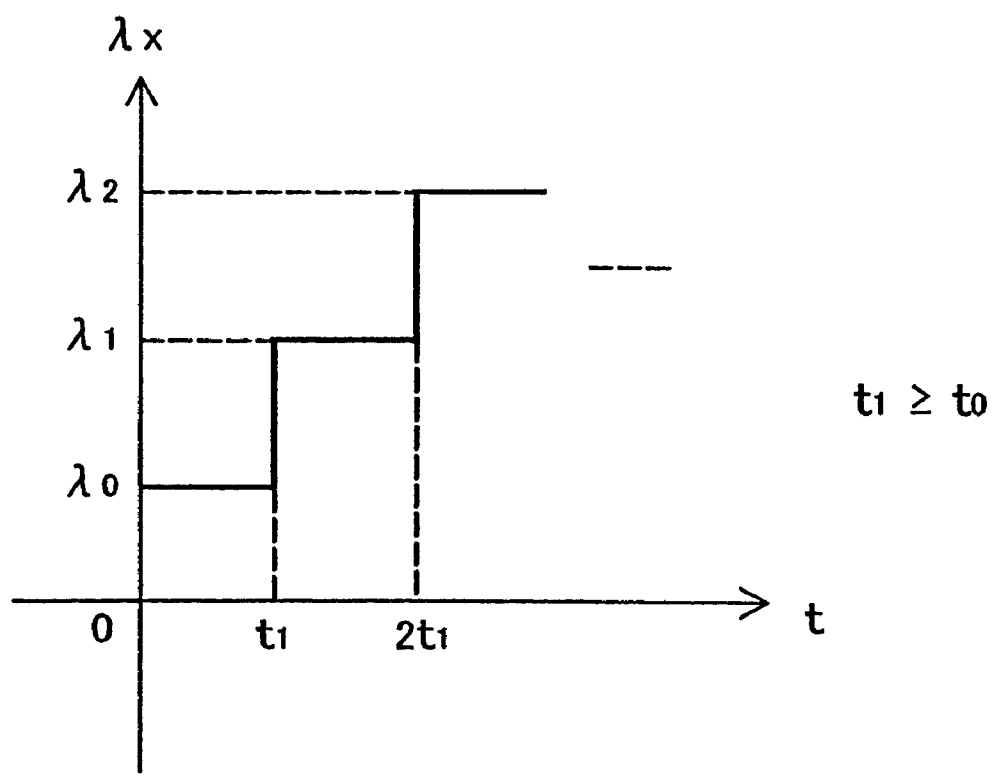
FIG. 10 shows a method for changing the wavelength of light generated by the light source system 100 in the prior art.

FIG. 7 is a block diagram schematically showing the construction of an optical characteristic measuring apparatus according to the third embodiment. Optical characteristic measuring apparatuses 52 and 54 according to the third embodiment comprise a light source system 10 and a characteristic measuring system 20, respectively. The internal constructions of light source systems 10 and characteristic measuring systems 20 are same as those of first embodiment and thus, the detailed illustration thereof has been omitted.

A one-fiber pair 40 comprises an optical fiber line 42 and an optical fiber line 44. The optical fiber line 42 comprises an optical fiber 42a and an optical amplifier 42b that is connected on the route of the optical fiber 42a to amplify a light. The optical fiber line 42 transmits the light in the right direction. The optical fiber line 44 comprises an optical fiber 44a and an optical amplifier 44b that is connected on the route of the optical fiber 44a to amplify a light. The optical fiber line 44 transmits the light in the left direction.

The light source system 10 of optical characteristic measuring apparatus 52 is connected to the incidence side of the optical fiber line 42 (first optical line). The characteristic measuring system 20 of optical characteristic measuring apparatus 52 is connected to the exit side of the optical fiber line 44 (second optical line).

The light source system 10 of optical characteristic measuring apparatus 54 is connected to the incidence side of the optical fiber line 44 (first optical line). The characteristic measuring system 20 of optical characteristic measuring apparatus 54 is connected to the exit side of the optical fiber line 42 (second optical line).

The operation of third embodiment is same as that of first embodiment.

According to the third embodiment, it is possible to measure both of the optical fiber lines 42 and 44 of one-fiber pair 40.

In addition, this embodiment can be implemented as follows. A media reading apparatus of a computer comprising a CPU, a hard disk, and a media reading apparatus (floppy disk, CD-ROM and the like) is rendered to read a media recorded with a program for implementing each of the above-mentioned sections and installs it in the hard disk. In this manner, the above functions can be implemented.

According to the present invention, since the time when the identification waveform detection means detects the identification waveforms is the time when the waveform starts to change, it is possible to obtain a synchronization of incidence side and exit side of a device-under-test using the time at which the identification waveform is detected. Accordingly, it is possible to obtain the synchronization of the incidence side and the exit side of a device-under-test even if the wavelength of a light source was continuously swept.

What is claimed is:

1. An apparatus for measuring optical characteristics of a device-under-test which transmits light, comprising:
    a variable-wavelength light source for generating a variable-wavelength light, the wavelength of which is variable, having an identification waveform at the time when the wavelength is changing, wherein the identification waveform is distinguishable from a normal waveform before and after the time when the wavelength is changing;
    an optical modulation means for modulating said variable-wavelength light at a predetermined frequency and then inputting it to said device-under-test; and
    an identification waveform detection means for detecting said identification waveform in the transmitted light transmitted through the device-under-test.

2. An apparatus for measuring optical characteristics as claimed in claim 1, wherein said identification waveform is a waveform different from said normal waveform in wavelength.

3. An apparatus for measuring optical characteristics as claimed in claim 1, wherein said identification waveform is a waveform different from said normal waveform in output condition.

4. An apparatus for measuring optical characteristics as claimed in claim 1, wherein said device-under-test includes a first optical line that transmits light only in one direction, and a second optical line that transmits light only in a direction opposite to said one direction, and
    wherein said variable-wavelength light source and optical modulation means are connected to the incidence side of said first optical line and said identification waveform detection means is connected to the exit side of said second optical line.

5. An apparatus for measuring optical characteristics as claimed in claim 1, further comprising:
    a phase measuring means for measuring the phase of said transmitted light by correlating it with said wavelength of said variable-wavelength light using the time at which said identification waveform detection means detects the identification waveform; and
    a characteristic calculation means for calculating group delay characteristics or dispersion characteristics of device-under-test using the phase of said transmitted light.

6. An apparatus for measuring optical characteristics as claimed in claim 1, wherein the wavelength of said variable-wavelength light is continuously changed.

7. An apparatus for measuring optical characteristics of a device-under-test which transmits light, comprising:
    a variable-wavelength light source for generating a variable-wavelength light, the wavelength of which is variable, having an identification waveform at the time when the wavelength is changing, wherein the identification waveform is distinguishable from a normal waveform before and after the time when the wavelength is changing; and
    an optical modulation means for modulating said variable-wavelength light at a predetermined frequency and then inputting it to said device-under-test.

8. An apparatus for measuring optical characteristics as claimed in claim 7, wherein said identification waveform is a waveform different from said normal waveform in wavelength.

9. An apparatus for measuring optical characteristics as claimed in claim 7, wherein said identification waveform is a waveform different from said normal waveform in output condition.

10. An apparatus for measuring optical characteristics as claimed in claim 7, wherein the wavelength of said variable-wavelength light is continuously changed.

11. An apparatus for measuring optical characteristics of a device-under-test which transmits light, comprising:
    an identification waveform detection means for detecting identification waveform in a transmitted light which is an incident light transmitted through said device-under-test, wherein the incident light is a variable-wavelength light, the wavelength of which is variable, having in the form of said identification waveform at the time when the wavelength is changing, and wherein the identification waveform is distinguishable from a normal waveform before and after the time when the wavelength is changing.

12. An apparatus for measuring optical characteristics as claimed in claim 11, wherein the wavelength of said variable-wavelength light is continuously changed.

13. An apparatus for measuring optical characteristics as claimed in claim 11, further comprising:
    a phase measuring means for measuring the phase of said transmitted light by correlating it with said wavelength of said variable-wavelength light using the time at which said identification waveform detection means detects the identification waveform; and a characteristic calculation means for calculating group delay characteristics or dispersion characteristics of a device-under-test using the phase of said transmitted light.

14. An apparatus for measuring optical characteristics as claimed in claim 11, wherein said identification waveform is a waveform different from said normal waveform in output condition.

15. An apparatus for measuring optical characteristics as claimed in claim 11, wherein said identification waveform is a waveform different from said normal waveform in wavelength.

16. A method for measuring optical characteristics of a device-under-test which transmits light, comprising:

a variable-wavelength light generating step for generating a variable-wavelength light, the wavelength of which is variable, having an identification waveform at the time when the wavelength is changing, wherein the identification waveform is distinguishable from a normal waveform before and after the time when the wavelength is changing;

an optical modulation step for modulating said variable-wavelength light at a predetermined frequency and then inputting it to said device-under-test; and an identification waveform detection step for detecting said identification waveform in the transmitted light transmitted through the device-under-test.

17. A method for measuring optical characteristics of a device-under-test which transmits light, comprising:

a variable-wavelength light generating step for generating a variable-wavelength light, the wavelength of which is variable, having an identification waveform at the time when the wavelength is changing, wherein the identification waveform is distinguishable from a normal waveform before and after the time when the wavelength is changing; and an optical modulation step for modulating said variable-wavelength light at predetermined frequency and then inputting it to said device-under-test.

18. An method for measuring optical characteristics of a device-under-test which transmits light, comprising:

an identification waveform detection step for detecting identification waveform in a transmitted light which is an incident light transmitted through said device-under-test, wherein the incident light is a variable-wavelength light, the wavelength of which is variable, having in the form of said identification waveform at the time when the wavelength is changing, and wherein the identification waveform is distinguishable from a normal waveform before and after the time when the wavelength is changing.

19. A computer-readable medium having a program of instructions for execution by a computer to perform an optical characteristic measuring process for measuring a characteristic of a device-under-test which transmits light, said optical characteristic measuring process comprising:

a variable-wavelength light generating processing for generating a variable-wavelength light, the wavelength of which is variable, having an identification waveform at the time when the wavelength is changing, wherein the identification waveform is distinguishable from a normal waveform before and after the time when the wavelength is changing;

an optical modulation processing for modulating said variable-wavelength light at a predetermined frequency and then inputting it to said device-under-test; and an identification waveform detection processing for detecting said identification waveform in the transmitted light transmitted through the device-under-test.

20. A computer-readable medium having a program of instructions for execution by a computer to perform an optical characteristic measuring process for measuring a characteristic of a device-under-test which transmits light, said optical characteristic measuring process comprising:

a variable-wavelength light generating processing for generating a variable-wavelength light, the wavelength of which is variable, having an identification waveform at the time when the wavelength is changing, wherein the identification waveform is distinguishable from a normal waveform before and after the time when the wavelength is changing; and an optical modulation processing for modulating said variable-wavelength light at a predetermined frequency and then inputting it to said device-under-test.

21. A computer-readable medium having a program of instructions for execution by a computer to perform an optical characteristic measuring process for measuring a characteristic of a device-under-test which transmits light, said optical characteristic measuring process comprising:

an identification waveform detection processing for detecting identification waveform in a transmitted light which is an incident light transmitted through said device-under-test, wherein the incident light is a variable-wavelength light, the wavelength of which is variable, having in the form of said identification waveform at the time when the wavelength is changing, and wherein the identification waveform is distinguishable from a normal waveform before and after the time when the wavelength is changing.

* * * * *